United States Patent
McCreary

Patent Number: 5,825,281
Date of Patent: Oct. 20, 1998

[54] METHOD OF DISPLAYING ADVERTISING MESSAGES

[76] Inventor: Ronald Kim McCreary, 13490 Mobery Road, Winfield, British Columbia, Canada, V4V 1A2

[21] Appl. No.: 889,962

[22] Filed: Jul. 10, 1997

Related U.S. Application Data

[60] Provisional application No. 60/021,619 Jul. 12, 1996.

[51] Int. Cl.⁶ ................................................. B60Q 1/00
[52] U.S. Cl. ...................... 340/425.5; 340/479; 340/463; 340/468
[58] Field of Search .......................... 340/425.5, 426, 340/479, 463, 464, 468, 470, 471, 472, 473

[56] References Cited

U.S. PATENT DOCUMENTS

| | | | |
|---|---|---|---|
| 3,750,138 | 7/1973 | Burgan et al. | 340/479 |
| 3,787,808 | 1/1974 | Knopf | 340/66 |
| 4,361,828 | 11/1982 | Hose | 340/479 |
| 4,574,269 | 3/1986 | Miller | 340/479 |
| 4,631,516 | 12/1986 | Clinker | 340/76 |
| 4,843,369 | 6/1989 | Jimenez et al. | 340/479 |
| 4,868,542 | 9/1989 | Thompson | 340/468 |
| 4,871,995 | 10/1989 | Hoang | 340/487 |
| 4,928,084 | 5/1990 | Reiser | 340/479 |
| 4,949,071 | 8/1990 | Hutchison | 340/468 |
| 4,974,354 | 12/1990 | Hembrook, Jr. | 40/546 |
| 5,039,978 | 8/1991 | Kronberg | 340/479 |
| 5,053,746 | 10/1991 | Taneo | 340/479 |
| 5,132,666 | 7/1992 | Fahs | 340/479 |
| 5,426,414 | 6/1995 | Flatin et al. | 340/479 |
| 5,500,638 | 3/1996 | George | 340/479 |
| 5,574,428 | 11/1996 | Groover | 340/468 |
| 5,652,565 | 7/1997 | Salcedas et al. | 340/479 |

*Primary Examiner*—Jeffery A. Hofsass
*Assistant Examiner*—Nina Tong
*Attorney, Agent, or Firm*—Antony C. Edwards

[57] ABSTRACT

A message to be displayed is sent to the display device from an onboard processor, having been retrieved from memory. The message comes on with the automotive brake lights and remains on until the brakes are released. The message changes with each application of the brake lights and is a continuous loop of sequentially displayed messages. In an alternative embodiment, the display remains on in a dimmer mode until the next application of the brakes changes the message. Thus, the message may be displayed while brake lights are energized, or alternatively, once brake lights are extinguished the message goes to a tail light mode having a reduced illumination level, for example, half as bright.

20 Claims, 3 Drawing Sheets

METHOD OF DISPLAYING ADVERTISING MESSAGES

This application is a continuation of the U.S. patent application Ser. No. 60/021,619, filed Jul. 12, 1996, now abandoned.

FIELD OF THE INVENTION

This invention relates to the field of billboard-type advertising displays, and in particular, such displays mountable onto vehicles.

BACKGROUND OF THE INVENTION

It is well known to advertise on the exterior surfaces of taxicabs, buses, or the like. The revenue from such advertising assists the operator in offsetting the costs of providing the service. It is also well known that in order for advertising to be effective, it must catch the eye of an observer. In the cluttered environment of city driving, catching the eye of a casual observer whether it be pedestrians or other motorists, is difficult once the initial impact of a fixed unchanging advertising display has been left mounted onto a vehicle for a period of time, especially if the advertising display is unlit and becomes covered with road grime and the like.

Consequently, it is an object of the present invention to provide a billboard-type advertising display which may be mounted on an exterior surface of a vehicle which will not obstruct the view of the driver, nor require the driver's attention, but will attract the attention of a casual observer by reason not only of its bright luminescence, but also because the advertising display flashes and is constantly changing. Thus it is an object of the present invention to provide an advertising display which takes advantage of the human eyes natural propensity to notice flashing or otherwise changing displays rather than static displays.

In the prior art, applicant is aware of U.S. Pat. No. 4,868,542 which issued to Thompson on Sep. 19, 1989 for an Automotive Brakelight and Communication System. Thompson discloses an automotive communication system including a light emitting diode display and a processing unit controlled by the braking system of the vehicle. In particular, Thompson teaches providing the driver of a vehicle with an onboard pre-edit screen for editing a message which is then displayed on a display mounted in the rear window of the vehicle. What is not taught nor suggested is providing a sequence of different messages within a memory unit wherein the processing unit sequentially displays the messages, a different message in the sequence being displayed every time the vehicle's brakes are applied.

SUMMARY OF THE INVENTION

In summary, the method of displaying advertising messages of the present invention comprises the steps of:

mounting a message display means on an exterior surface of a vehicle, wherein the vehicle has brakes triggered by brake triggering means;

electrically cooperatively connecting the message display means to said brake triggering means and a processing means;

wherein said brake triggering means is actuated or otherwise initiated by an initiating event, such as actuation of a brake pedal;

and wherein the processing means is selectively programmable to receive into, and retrieve from, a memory unit a series or first sequence of advertising messages;

and wherein the initiating event causes the processing means to send one message from the series or first sequence of advertising messages to the display means to be displayed by the message display means, the processing means adapted to send a preselected second sequence of different messages selected from the series or first sequence of advertising messages in response to repetitions of the initiating event and wherein each sequential message of the second sequence of different messages replaces a previously sent sequential message in the second sequence of different messages.

DETAILED DESCRIPTION OF PREFERRED EMBODIMENTS

In operation, a message to be displayed is sent to the display device from an onboard processor, having been retrieved from memory. The message comes on with the automotive brake lights and remains on until the brakes are released. The message changes with each application of the brake lights and is a continuous loop of sequentially displayed messages. In an alternative embodiment, the display remains on in a dimmer mode until the next application of the brakes changes the message. Thus, the message may be displayed while brake lights are energized, or alternatively, once brake lights are extinguished the message goes to a tail light mode having a reduced illumination level, for example, half as bright.

The method of the present invention has three applications. The first application has a high or roof top mounted electronic LED reader board display for mounting on a taxi or similar vehicle. The second application has an electronic LED reader board display mounted in the rear trunk lid spoiler or air dam. The third application has a flat mounted LED reader display mounted on a flat surface, for example, a truck or van tailgate, although the display may be mounted on other types of vehicles having brakes.

All displays will perform the same functions controlled by a computer program in an on-board processor retrieving data from a programmable memory unit.

All display messages may, in a further alternative embodiment, be programmed via computer modem communication by staff at a central location and would be password protected. Automotive advertising displays may have an emergency switch under the dash that will activate an emergency over-ride mode that would display a CALL-911 type of distress message. The advertising displays may be equipped with a modem or the like to enable remote reprogramming. The sequence of messages may not be edited by the driver of the vehicle, and requires no driver attention, but may be edited at the on-board processor by servicing technicians.

The displays may advantageously be of the super bright type of light emitting diode components.

Figure 2:
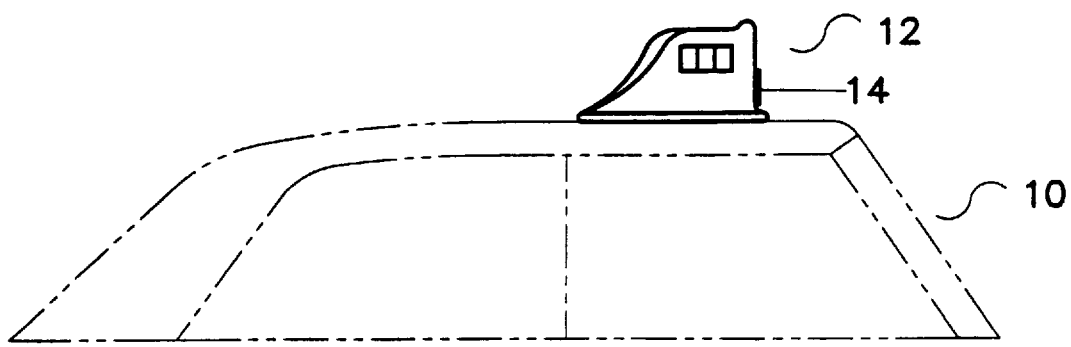
FIG. 2 is, in side elevation view, the electronic advertising message display of FIG. 1.
Figure 1:
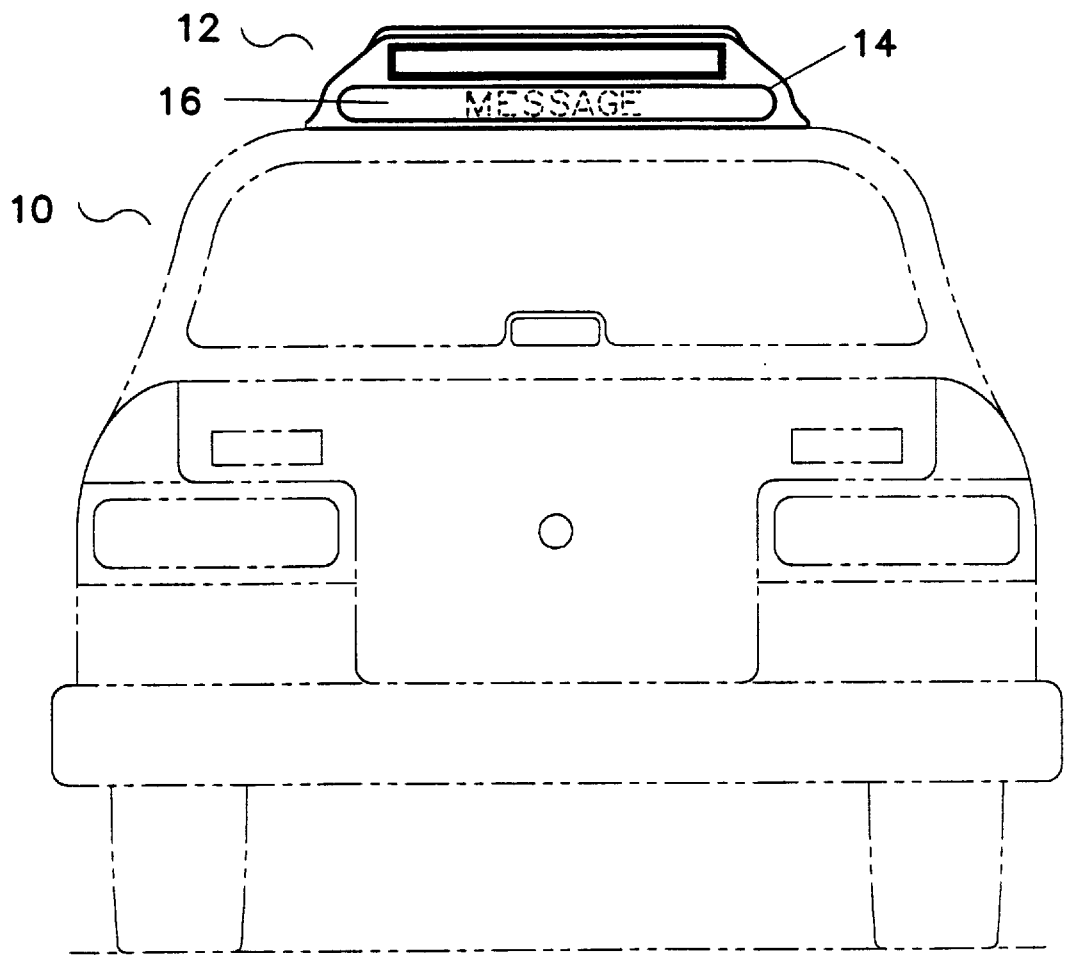
FIG. 1 is, in rear elevation view, an electronic advertising message display mounted atop a vehicle.

As may be seen in FIGS. 1 and 2, vehicle 10 may have mounted onto its roof an advertising display 12. On an exterior surface of advertising display 12, such as a generally vertical rear surface as illustrated, is mounted a display surface 14 of an electronic message display device mounted within advertising display 12. Electronic message display 14 is electrically connected to a processor and a memory device which may be random access memory or other retrievable or read/write memory devices known in the art, all of which may be contained in an onboard computer mounted within vehicle 10. A sequence of messages 16 are stored within the memory device. The processor is electrically connected to the brake pedal or the brake light circuit or the like so that when the brake pedal is depressed, the processor is triggered by an electrical triggering event so as to retrieve the next message 16 in the sequence stored in the memory device and to display that next message 16 in the sequence on the display 14. The processor may be programmed to leave the message displayed either a preprogrammed amount of time or until the next time the brake pedal is depressed or it may extinguish the display whenever the brake pedal is released.

In this fashion, messages 16 change every time the brake is applied so to cycle through the sequence of messages stored in the memory device. Alternatively, the processor may randomly select the next message to be displayed from the sequence of messages stored in the memory device.

Figure 4:
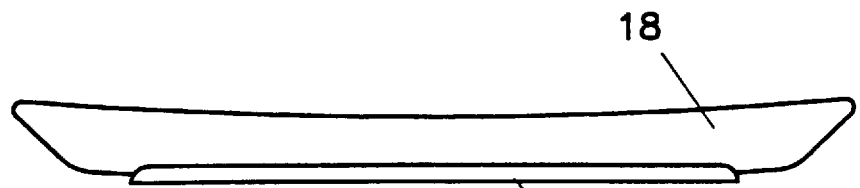
FIG. 4 is, in plan view, the electronic advertising message display of FIG. 3.
Figure 5:
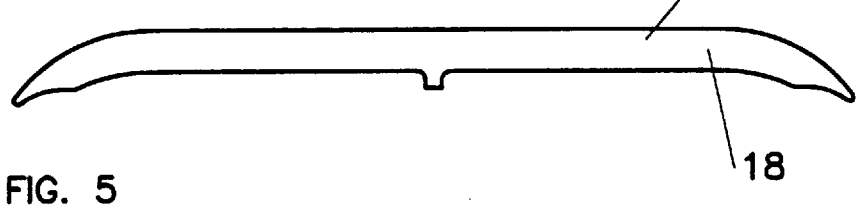
FIG. 5 is, in front elevation view, the electronic advertising message display of FIG. 3.
Figure 3:
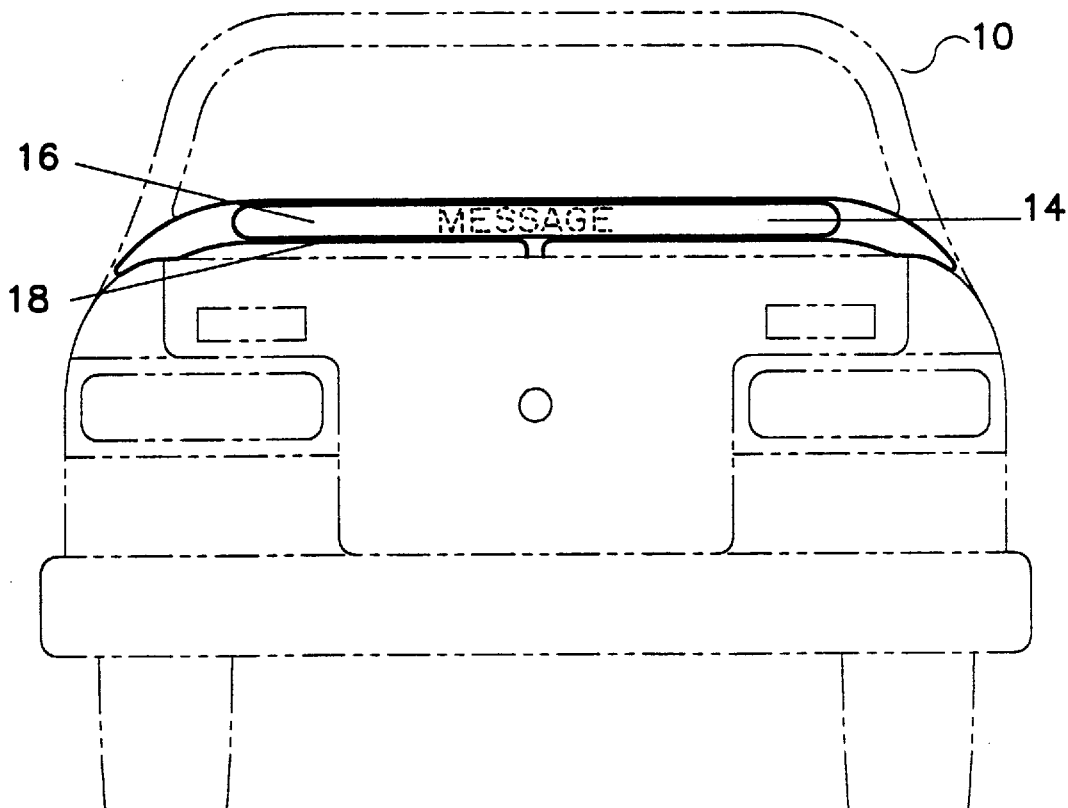
FIG. 3 is, in rear elevation view, an alternative embodiment of the electronic advertising message display according to the method of the present invention.

FIGS. 3-6 illustrate two further embodiments and in particular two alternative locations for mounting display 14. In FIGS. 3-5, display 14 are mounted on a rear surface of a generally horizontal bar such as a spoiler 18 which may be mounted to the rear trunk of vehicle 10.

Figure 6:
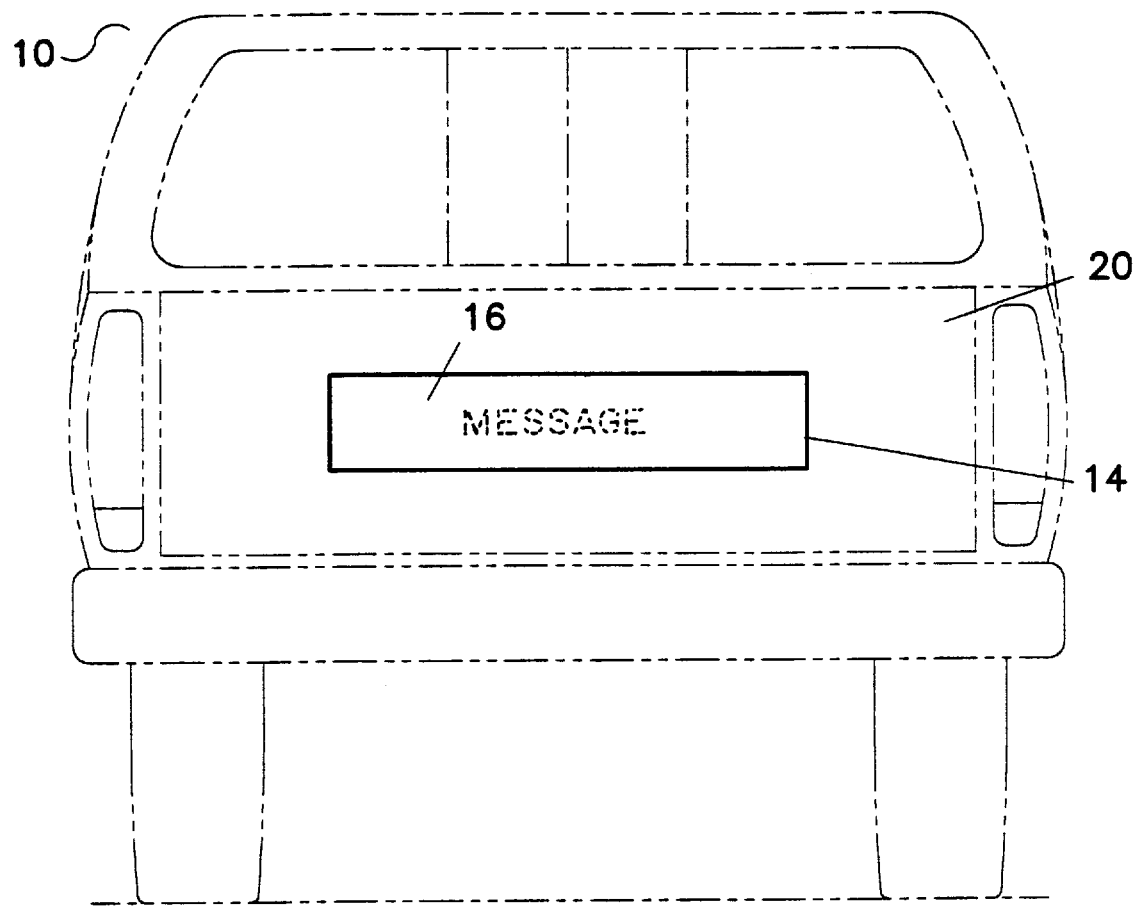
FIG. 6 is, in rear elevation view, an alternative embodiment of the electronic advertising message display according to the method of the present invention.

In FIG. 6, display 14 is mounted on a tailgate 20 of vehicle 10.

The various alternative types of display 14 allow for different sizes of message 16 to be displayed. Message 16 in FIGS. 1 and 2 may be of letters 4 inches high and 18 characters across as a typical example. In FIGS. 3-5, message 16 is somewhat smaller being approximately 2 inches high and 18 characters across. In FIG. 6, message 16 may be much larger, merely limited by the size of tailgate 20.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. In a vehicle having vehicle brakes triggered by brake triggering means, a method of sequentially displaying advertising messages comprising the steps of:
    a) mounting a message display means on an exterior surface of said vehicle,
    b) electrically cooperatively connecting said message display means to an onboard processing means mounted on board said vehicle,
    c) electrically cooperatively connecting said onboard processing means to said brake triggering means,
    d) initiating said brake triggering means by an initiating event and programming said processing means to sequentially retrieve from a memory unit a series of advertising messages stored within said memory unit,
    e) causing said processing means to retrieve one complete message from said series of advertising messages upon said initiating event and communicating said one complete message from said series of advertising messages to said message display means for display externally of said vehicle,
    f) retrieving each complete message from said series of advertising messages by said processing means is communicated to said message display means so as to sequentially completely replace a message previously communicated to said message display means,
    g) programming said processing means to send a sequence of different complete messages selected by said processing means from said series of advertising messages stored within said memory unit in response to repetitions of said initiating event,
    h) displaying a different complete message every time said vehicle brakes are triggered.

2. The method of claim 1 wherein said message display means is a light emitting diode display.

3. The method of claim 2, further comprising the steps of mounting said light emitting diode display into an advertising housing, and mounting said advertising housing onto an upper exterior surface of said vehicle.

4. The method of claim 3, further comprising the step of mounting said light emitting diode display into a rear surface of a vehicle spoiler.

5. The method of claim 3, further comprising the step of mounting said light emitting diode display onto a rear generally planar surface of said vehicle.

6. The method of claim 1, further comprising the step of editing said series of advertising messages in said processing means which is programmable.

7. The method of claim 6 wherein editing of said series of advertising messages may be edited remotely remote from said vehicle, by remote communication means communicating with said processing means.

8. The method of claim 1 wherein said brake triggering means is a brake pedal and said initiating event is depressing said brake pedal.

9. The method of claim 1 further comprising the step of mounting said processing means which is a computer, into said vehicle, and said memory unit is a memory device within said computer.

10. The method of claim 9, further comprising the step of programming said computer to replay a selection of a stored series of advertising messages stored within said memory device.

11. The method of claim 10, further comprising the step of programming new advertising messages into said computer, so as to be added to said stored series of advertising messages, by an input/output interface on said computer.

12. The method of claim 10, further comprising the step of remotely programming new advertising messages into said computer, so as to be added to said stored series of advertising messages, by remote programming means.

13. In a vehicle having vehicle brakes triggered by brake triggering means wherein said brake triggering means is initiated by an initiating event, a device for sequentially displaying advertising messages comprising:
    a) a message display means mountable on an exterior surface of said vehicle,
    b) an onboard processing means, electrically cooperatively connectable to said message display means, and mountable on board said vehicle, c) said onboard processing means electrically cooperatively connectable to said brake triggering means, wherein said processing means is programmable to sequentially retrieve from a memory unit a series of advertising messages storable within said memory unit, and wherein said initiating event causes said processing means to retrieve one complete message from said series of advertising messages and to communicate said one complete message from said series of advertising messages to said message display means for display externally of said vehicle, and wherein each complete message retrieved from said series of advertising messages by said processing means is communicated to said message display means so as to sequentially completely replace a message previously communicated to said message display means, and wherein said processing means is programmed to send a sequence of different complete messages selected by said processing means from said series of advertising messages stored within said memory unit in response to repetitions of said initiating event, whereby a different complete message is displayed every time said vehicle brakes are triggered.

14. The device of claim 13 wherein said message display means is a light emitting diode display.

15. The device of claim 14 wherein said light emitting diode display is mountable into an advertising housing, wherein said advertising housing is adapted for mounting onto an upper exterior surface of said vehicle.

16. The device of claim 15 wherein said light emitting diode display is mountable into a rear surface of a vehicle spoiler.

17. The device of claim 15 wherein said light emitting diode display is mountable onto a rear generally planar surface of said vehicle.

18. The device of claim 13 wherein said processing means is programmable so that said series of advertising messages may be edited.

19. The device of claim 18 wherein editing of said series of advertising messages may be edited remotely remote from said vehicle, by remote communication means communicating with said processing means.

20. The device of claim 13 wherein said brake triggering means is a brake pedal and said initiating event is depressing said brake pedal.

\* \* \* \* \*